United States Patent [19]

Sukow et al.

[11] 4,082,941
[45] Apr. 4, 1978

[54] BAG SEALER

[75] Inventors: Daniel L. Sukow, Grafton; Richard A. Smith; James B. Cockroft, both of Wauwatosa, all of Wis.

[73] Assignee: Oster Corporation, Milwaukee, Wis.

[21] Appl. No.: 704,901

[22] Filed: Jul. 13, 1976

[51] Int. Cl.² .............................................. H05B 1/00
[52] U.S. Cl. ................................. 219/243; 93/DIG. 1; 156/515
[58] Field of Search ................. 219/243; 156/515, 583; 53/33; 93/DIG. 1

[56] References Cited

U.S. PATENT DOCUMENTS

| | | | |
|---|---|---|---|
| 2,961,031 | 11/1960 | Fener | 219/243 X |
| 3,354,018 | 11/1967 | Lazear | 156/515 |
| 4,031,815 | 6/1977 | Verbeka | 156/515 X |

Primary Examiner—C. L. Albritton
Attorney, Agent, or Firm—George R. Clark; Neil M. Rose; Clifford A. Dean

[57] ABSTRACT

A bag sealer having an electrically heated wire and a pivotally mounted sealing member which is substantially parallel to and normally biased away from the wire. An integral transformer and solenoid are provided for reducing the voltage supplied to the wire and for bringing the sealing member into pressure bearing relationship with the wire. The primary winding of the transformer serves as the solenoid coil while the solenoid armature, upon being closed, completes the transformer. In order to facilitate activating the switch to energize the transformer winding, a lever extends out through the housing. Molded side pieces carry an extruded channel on which is mounted a resilient pressure bar.

6 Claims, 6 Drawing Figures

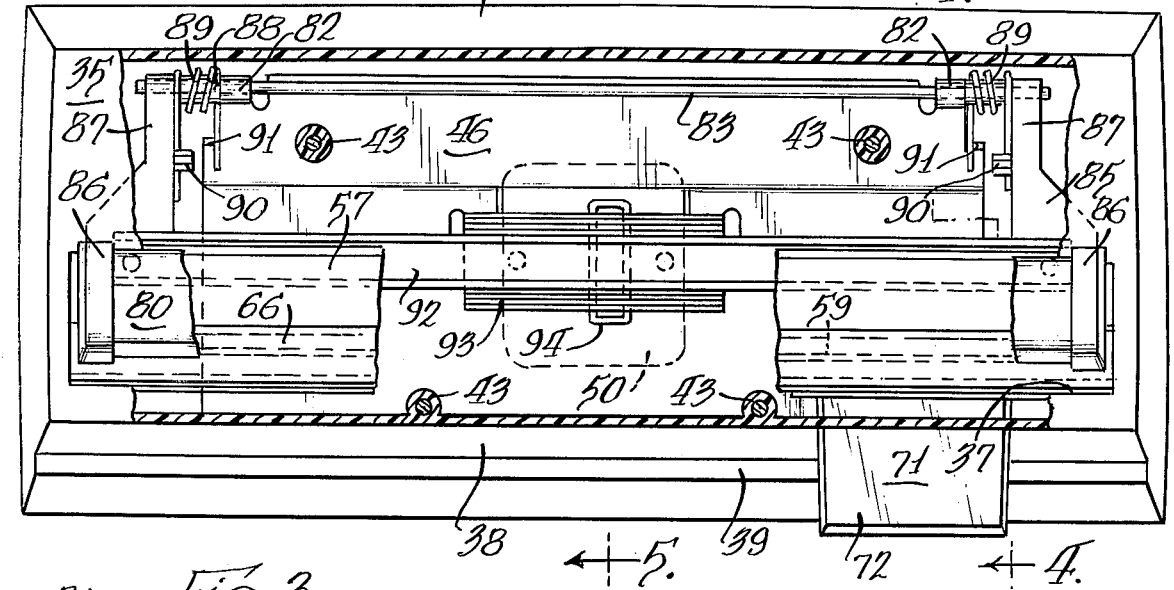

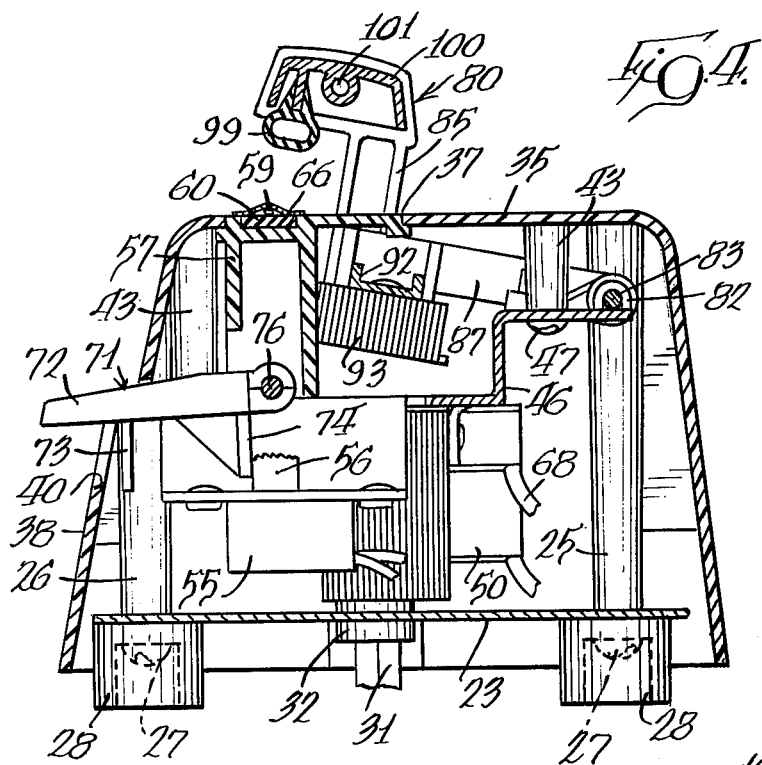
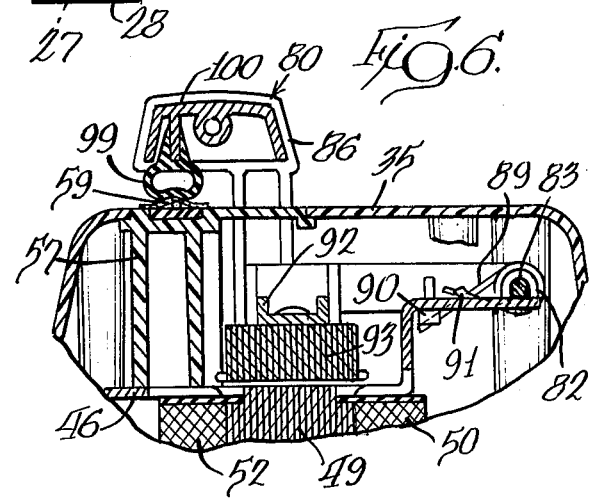
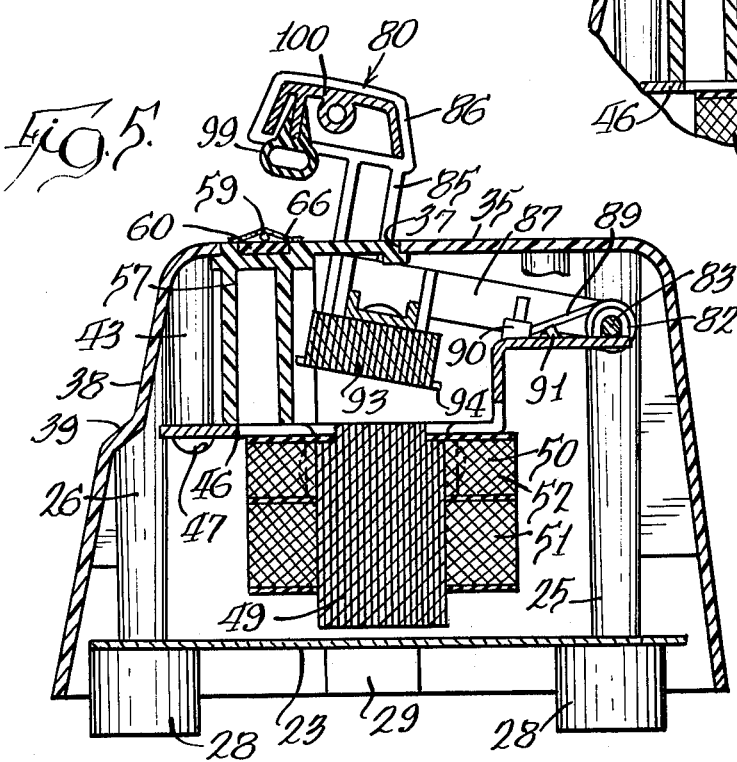

BAG SEALER

BACKGROUND OF THE INVENTION

Bag sealers have become increasingly popular in recent years for use in the household. Generally the bag sealers are adapted to be either stored and used on a kitchen countertop or mounted on a vertical wall. Regardless of the position of the bag sealer it is necessary for the user to support the filled bag for sealing and to bring the sealing means into contact with the two sides of the bag to effect a seal. It is usually recommended that the ends of the bag be maintained taut in order to obtain a proper seal. Thus the user is often faced with the dilemma of needing three hands, two to properly support the bag, particularly when it is filled with liquids, and a third hand to bring the heat sealing means into contact with the bag.

In the prior art there have been attempts to facilitate holding the bag by means of posts or pins like those shown in Bair U.S. Pat. No. 3,731,054 which cooperate with holes in the bag to support the bag. Another approach involves motor activated means such as those shown in Techtmann et al U.S. Pat. No. 3,375,777 for mechanically bringing the heat sealing means into contact with the bag. The bag supporting pins provide a viable solution although mishaps, such as the bag tearing loose from the pins, can occur. The motor operated means for bringing the heat sealing element into pressure contact with the bag are slow and can cause problems particularly with respect to a bag full of stew or other liquid containing materials. Both of the aforementioned solutions also have a disadvantage of significantly increasing the cost of the sealer itself, the bags, or both the sealer and the bags.

SUMMARY OF THE INVENTION

The present invention involves a bag sealer wherein means are provided which are easily actuated by the user for causing the heating or sealing element to engage the bag to be sealed. A transformer is provided for reducing the line voltage going to the heating element wire. The primary of the transformer also serves as a solenoid coil that cooperating with an armature carried by the pressure bar effects snap acting downward movement of the pressure bar. Upon closing the solenoid, the transformer is completed and supplies the low voltage to the heating element wire.

Accordingly, it is an object of the present invention to provide a bag sealer which is inexpensive to manufacture.

It is a further object of the present invention to provide a bag sealer wherein the user may easily effect movement of the pressure bar into engagement with the bag to be sealed.

It is an additional object of the present invention to provide a bag sealer with a solenoid for moving the pressure bar into engagement with the bag to be sealed that uses the primary winding of a transformer for reducing the voltage to the wire heating element as a coil for the solenoid.

Further objects and advantages of the present invention will become apparent as the following description proceeds and the featuers of novelty which characterize the invention will be particularly pointed out in the claims annexed to and forming a part of the specification.

BRIEF DESCRIPTION OF THE DRAWINGS

For a better understanding of the present invention reference may be had to the accompanying drawings in which:

FIG. 1 is a perspective view of a bag sealer embodying the invention;

FIG. 2 is a top plan view of the bag sealer of FIG. 1 with part of the upper portion cut away to expose the mechanism;

FIG. 3 is a vertical section taken substantially along the line 3—3 of FIG. 1;

FIG. 4 is a section taken substantially along the line 4—4 of FIG. 2;

FIG. 5 is a section taken substantially along the line 5—5 of FIG. 2; and

FIG. 6 is a fragmentary sectional view similar to that shown in FIG. 5 but showing the unit in sealing operation.

DESCRIPTION OF THE PREFERRED EMBODIMENT

Referring now to the drawings in which like parts are designated with like reference numerals in the various views, there is shown in FIG. 1 a bag sealer generally designated by the reference numeral 20. A plastic molded housing 21 encloses the bag sealer mechanism on five sides. The open bottom of the one-piece housing is provided with a cover plate 23.

Integrally molded with the housing 21 are two long downwardly depending bosses 25 at the rear of the housing and two somewhat shorter downwardly depending bosses 26 at the front of the housing (only one of the forwardly disposed bosses 26 appears in the drawings). Cover plate 23 is secured to the bosses 25 and 26 by means of screws 27 which also serve to secure the rubber feet 28 to the bottom of the cover plate. The rubber feet serve to protect either the vertical wall upon which the bag sealer may be mounted by means of conventional keyhole shaped slots (not shown in the drawings) formed in the cover plate 23 or the countertop upon which the unit may be placed. Punched out of the cover plate 23 are downwardly depending tabs 29 around which the power cord 31 may be wrapped for storage when the unit is placed upon a countertop. The cord may also be wound around the tabs 29 to shorten it when the unit is more permanently mounted on a wall. A hole in the cover plate is provided with a strain relief member 32 through which the power cord 31 extends.

The top wall 35 of the bag sealer housing is provided with an elongated slot 37. The front wall 38 of the housing 21 is provided with a step 39 for aesthetic purposes. The front wall 38 is also provided with an aperture 40 near the right hand side of the front wall about half way from the top.

In addition to the cover plate mounting bosses 25 and 26, four integral mounting posts 43 depend from the inside of the top wall 35. The bag sealing mechanism which comprises a subassembly carried by bracket 46 is secured to the housing by means of screws 47 passing through suitable apertures in the bracket 46 and into the mounting posts 43.

Secured to the bottom of the bracket 46 is an E-shaped field lamination 49 of low carbon electrical steel. On the E lamination is a plastic bobbin 50 having a primary winding 51 and a secondary winding 52. The power cord 31 is connected to the primary winding 51 through a switch 55. The voltage from the secondary winding is stepped down to about 8 volts. This avoids any shock hazards to the user who might inadvertently contact the heated sealing wire. Switch 55 is a standard single pole, single throw normally biased upon open switch with a forwardly biased button 56 riveted to the bracket 46.

Also mounted on the bracket 46 is a plastic support 57 a portion of which serves as an anvil for the heated sealing wire 59. Support 57 also serves to close the slot 37 in the top of the housing. On the top surface of the plastic support 57 there is a shallow channel into which an insulator 60 is placed. The insulator is formed of an asbestos paper reinforced phenolic sheet. The heated sealing wire 59 which is formed with loops (not shown) at either end is mounted on top of the insulator 60. Leaf springs 62 having tabs 63 are secured to the sides of the plastic support by means of screws 64 as is best shown in FIG. 3. The loops at each end of the wire fit onto the tabs 63 such that the leaf springs 62 maintain the heat sealing wire taut across the insulator 60. A strip of Teflon tape 66 is placed on top of the wire 59 and the insulator 60; the purpose of the tape is to prevent the plastic bags from sticking to the heat sealing wire during the bag sealing operation. The leaf springs 62 also serve as electrical contacts for the heat sealing wire 59. Leads 68 from the secondary coil 52 are connected to terminal ends 69 on the leaf springs 62.

Plastic member 57 also carries a switch lever 71. The switch lever has a substantially horizontal portion 72 from which depend integral vertical wall portions 73 and 74. Forward vertical wall 73 extends across the entire width of the switch lever 71 and closes the aperture 40 in the front wall of the bag sealer housing through which the forward portion of the horizontal member 72 protrudes. The rearward vertical portion 74 abuts the forwardly biased button 56 on the switch 55. As is best shown in FIG. 4, the rearward portion of the switch lever 71 is formed with a horizontally extending aperture such that the lever may be hingedly mounted on a pin 76 which, as is best shown in FIG. 3, is secured to the plastic support 57. There are grooves provided in the underside of the support 57 into which the pin 76 fits and is trapped by the head of the screw 77 and also by a part of the brakcet 46. Thus it will be seen that when the switch lever 71 is pivoted downwardly the portion of the vertical wall 74 which abuts the switch button 56 will move the button rearwardly to the switch closing position.

Bracket 46 carries a third element of the heat sealing mechanism subassembly, namely the pressure sealing member 80. The rearward portion of the bracket 46 forms a pintle 82 for hinged mounting of the member 80. Hinge pin 83 fits into the pintle 82. Attached to each end of the pin 83 is a plastic molded side piece 85. Each side piece 85 is somewhat Z-shaped with an upper horizontal arm 86 and a lower horizontal arm 87. A collar 88 on the lower arm fits over the hinge pin 83 and carries a coil spring 89. One leg of each of the coil springs abuts a boss 90 on the side arm 85 while the other leg of the spring is trapped by a stamped projection 91 on the bracket 46, thus biasing the pressure member 89 upwardly.

The lower horizontal arm 87 of the Z also carries channel 92 at its forward end. The channel 92 is secured between the two side pieces 85 by staking or any other conventional means. A lamination 93 is carried by the channel 92. The lamination is spot welded to the channel 92. The lamination 93 which serves as a solenoid armature has a copper wire shading coil 94.

The actual rubber pressure sealer 99 is mounted on an extruded aluminum channel 100 which is secured between the upper horizontal arms 86 of the side pieces 85. The extrusion 100 fits into inwardly facing recesses on each of the side pieces 85 and is secured to them by means of screws which are threadedly received in the extruded aperture 101.

When the user exerts a downward force on the switch lever 71 the normally biased open switch 55 is closed thereby energizing the primary winding 51. The energized coil and lamination will serve as an electromagnet attracting the lamination 93 thereby quickly moving the pressure bar down into engagement with the Teflon tape coated heated sealing wire. When the armature 93 moves down it completes a transformer and the secondary winding 52 then activates the heat sealing wire 59. All the user need do to activate the heat sealing wire and bring the pressure bar down into engagement with it is to exert a slight pressure with say the little finger of the ring hand upon the switch lever 71. Thus it will be appreciated that the user may easily maintain the filled plastic bag tautly in position for proper seaing.

While a particular embodiment of the present invention has been shown and described, it will be apparent to those skilled in the art that various changes and modifications may be made without departing from the invention in its broader aspects, and it is therefore contemplated in the appended claims to cover all such changes and modifications as fall within the true spirit and scope of the present invention.

What is claimed as new and desired to be secured by Letters Patent of the United states is:

1. A bag sealer comprising a housing, an electrically heated wire supported on a fixed portion of said housing, a sealing member hingedly mounted on said housing for pivoting movement downwardly toward said wire about an axis disposed rearwardly of said wire, and a combination solenoid and transformer disposed in said housing with a primary coil being connected to a source of power through a manually actuated switch, with a secondary coil being connected in series with said wire, and with an armature being mounted on said hingedly mounted sealing member in spaced alignment with said coils, whereupon actuation of said switch, when unsealed edges of a plastic bag to be sealed are supported along said wire, causes (1) downward movement of said armature toward said coils and accompanying downward movement of said sealing member into sealing engagement with said bag edges and (2) the passage of current through said wire, heating same sufficiently to effect sealing of said bag edges.

2. A bag sealer as defined in claim 1 wherein said switch has a pivotally mounted lever which extends forwardly through an opening formed in the front of said housing.

3. A bag sealer as defined in claim 1 wherein said sealing member is normally biased away from said wire.

4. A bag sealer as defined in claim 1 wherein said sealing member comprises a pair of side pieces, each of said side pieces being hingedly mounted at one side of said housing, an extruded channel trapped between said side pieces and a resilient sealing bar carried by said channel.

5. A bag sealer as defined in claim 1 wherein said wire, said sealing member and said combination solenoid and transformer comprise a subassembly carried by a single bracket, said housing having integrally formed internal mounting bosses and sid bracket being secured to said mounting bosses.

6. A bag sealer as defined in claim 5 wherein said wire is supported by an anvil member, said anvil member being secured to said bracket, and wherein said wire is biased into constant tension across said anvil member by a pair of leaf springs connected to opposite ends of said wire and serving as electrical contacts between said wire and said secondary winding.

* * * * *